(12) United States Patent
Atkins

(10) Patent No.: US 9,961,237 B2
(45) Date of Patent: May 1, 2018

(54) DISPLAY MANAGEMENT FOR HIGH DYNAMIC RANGE VIDEO

(71) Applicant: Dolby Laboratories Licensing Corporation, San Francisco, CA (US)

(72) Inventor: Robin Atkins, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days. days.

(21) Appl. No.: 15/544,320

(22) PCT Filed: Jan. 14, 2016

(86) PCT No.: PCT/US2016/013352
§ 371 (c)(1),
(2) Date: Jul. 18, 2017

(87) PCT Pub. No.: WO2016/118395
PCT Pub. Date: Jul. 28, 2016

(65) Prior Publication Data
US 2018/0013927 A1    Jan. 11, 2018

Related U.S. Application Data

(60) Provisional application No. 62/105,139, filed on Jan. 19, 2015.

(51) Int. Cl.
*G06K 9/00* (2006.01)
*H04N 1/60* (2006.01)
*H04N 9/64* (2006.01)

(52) U.S. Cl.
CPC ......... *H04N 1/6058* (2013.01); *H04N 1/6005* (2013.01); *H04N 9/646* (2013.01)

(58) Field of Classification Search
CPC ........ H04N 5/2355; G06T 2207/20208; G06T 5/007
See application file for complete search history.

(56) References Cited

U.S. PATENT DOCUMENTS 5,737,032 A    4/1998   Stenzel
7,822,270 B2   10/2010  Van Hoof
(Continued)

FOREIGN PATENT DOCUMENTS

CN    102611897    7/2012
CN    103563376    2/2014
(Continued)

OTHER PUBLICATIONS

Marguier et al.; "Color matching functions for a perceptually uniform RGB space"; ICSS/CIE Expert symposium, Ottawa, Canada, Dec. 2006.*
(Continued)

*Primary Examiner* — Eueng-Nan Yeh

(57) ABSTRACT

A display management processor receives an input image with enhanced dynamic range to be displayed on a target display which has a different dynamic range than a reference display. The input image is first transformed into a perceptually-quantized (PQ) color space, preferably the IPT-PQ color space. A color volume mapping function, which includes an adaptive tone-mapping function and an adaptive gamut mapping function, generates a mapped image. A detail-preservation step is applied to the intensity component of the mapped image to generate a final mapped image with a filtered tone-mapped intensity image. The final mapped image is then translated back to the display's preferred color space. Examples of the adaptive tone mapping and gamut mapping functions are provided.

17 Claims, 4 Drawing Sheets

(56) References Cited

U.S. PATENT DOCUMENTS

| | | |
|---|---|---|
| 8,731,287 B2 | 5/2014 | Su |
| 9,076,224 B1 | 7/2015 | Shah |
| 9,077,994 B2 | 7/2015 | Miller |
| 9,224,363 B2 | 12/2015 | Ballestad |
| 9,230,338 B2 | 1/2016 | Kunkel |
| 9,554,020 B2 | 1/2017 | Thurston, III |
| 9,584,786 B2 | 2/2017 | Atkins et al. |
| 2013/0050245 A1 | 2/2013 | Longhurst |
| 2013/0120656 A1 | 5/2013 | Wilson |
| 2014/0002478 A1 | 1/2014 | Ballestad |
| 2014/0002480 A1 | 1/2014 | Bhaskaran |
| 2014/0267822 A1* | 9/2014 | Roffet .................... H04N 5/225 348/222.1 |
| 2015/0071537 A1* | 3/2015 | Lim ........................ G06T 5/40 382/168 |
| 2016/0005349 A1 | 1/2016 | Atkins |

FOREIGN PATENT DOCUMENTS

| | | |
|---|---|---|
| CN | 103918274 | 7/2014 |
| CN | 104041036 | 9/2014 |
| EP | 1073284 | 1/2001 |
| EP | 1385143 | 1/2004 |
| WO | 2013/046096 | 4/2013 |
| WO | 2014/130343 | 8/2014 |

OTHER PUBLICATIONS

SMPTE Standard; "High dynamic range electro-optical transfer function of mastering reference displays"; The Society of motion picture and television engineers; Aug. 2014; SMPTE ST 2084:2014.*

Ebner, F. et al "Development and Testing of a Color Space (IPT) with Improved Hue Uniformity" Proc. 6th Color Imaging Conference: Color Science, Systems, and Applications, IS&T, Scottsdale, Arizona, Nov. 1998, pp. 8-13.

Fairchild, M. D. et al "Predicting the Lightness of Chromatic Object Colors Using CIELAB" Color Research & Application, vol. 16, No. 6, Dec. 1, 1991, p. 386.

ITU-R BT.1866, Mar. 2010.

Liu, Z. et al "The Research on Mechanism of Color Management System Based on iCam Color Appearance Model" Computers and Mathematics with Applications, Pergamon Press, vol. 57, No. 11-12, Jun. 1, 2009, pp. 1829-1834.

Mantiuk, R. et al "Color Correction for Tone Mapping" Computer Graphics Forum, Wiley-Blackwell Publishing Ltd. vol. 28, No. 2, Apr. 1, 2009, pp. 193-202.

Zolliker, P. et al "Retaining Local Image Information in Gamut Mapping Algorithms" IEEE Transactions on Image Processing, Piscataway, NJ, US, vol. 16, No. 3, Mar. 1, 2007, p. 665.

* cited by examiner

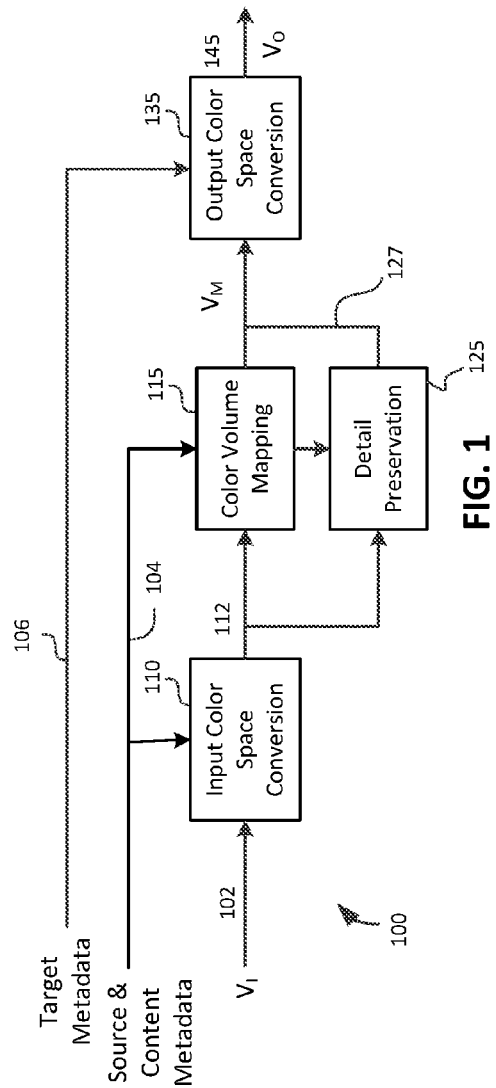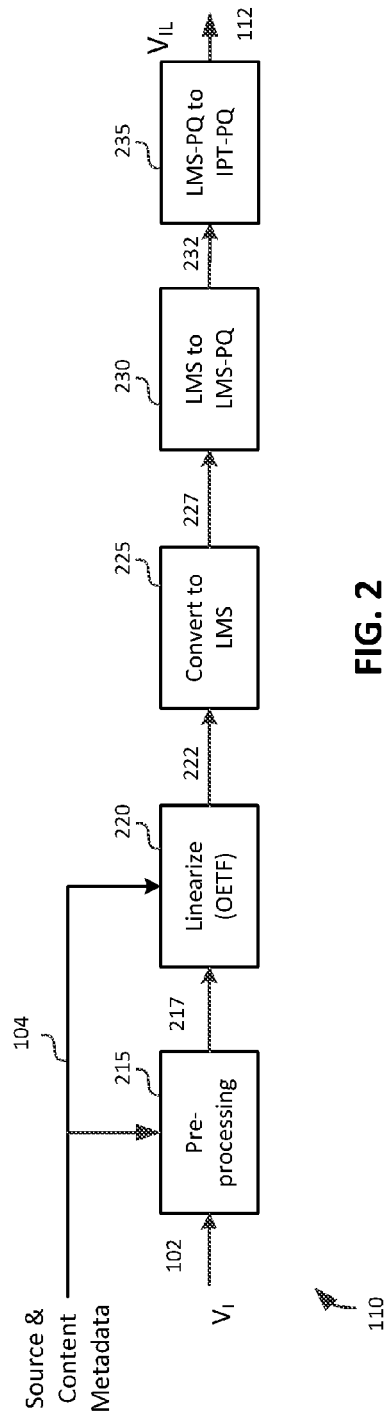

DISPLAY MANAGEMENT FOR HIGH DYNAMIC RANGE VIDEO

CROSS-REFERENCE TO RELATED APPLICATIONS

This application claims priority from U.S. Provisional Patent Application Ser. No. 62/105,139, filed on Jan. 19, 2015, which is hereby incorporated by reference in its entirety.

TECHNOLOGY

The present invention relates generally to images. More particularly, an embodiment of the present invention relates to the display management process of images with high or enhanced dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a human visual system (HVS). As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support luminance of 200 to 300 cd/m$^2$ or nits. Most consumer HDTVs range from 300 to 1000 cd/m$^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more). In general, the methods of the present disclosure relate to any dynamic range higher than SDR. As appreciated by the inventors here, improved techniques for the display management of high-dynamic range images onto HDR and SDR displays are desirable for both backward compatibility and a superior immersive experience.

As used herein, the term "display management" denotes the processing (e.g., tone and gamut mapping) required to map an input video signal of a first dynamic range (e.g., 1000 nits) to a display of a second dynamic range (e.g., 500 nits).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1 depicts an example process for the display management of EDR images according to an embodiment of the present invention;

FIG. 2 depicts an example process for converting input EDR data from an input color space into a perceptually-quantized space according to an embodiment of the present invention;

DESCRIPTION OF EXAMPLE EMBODIMENTS

Figure 3:
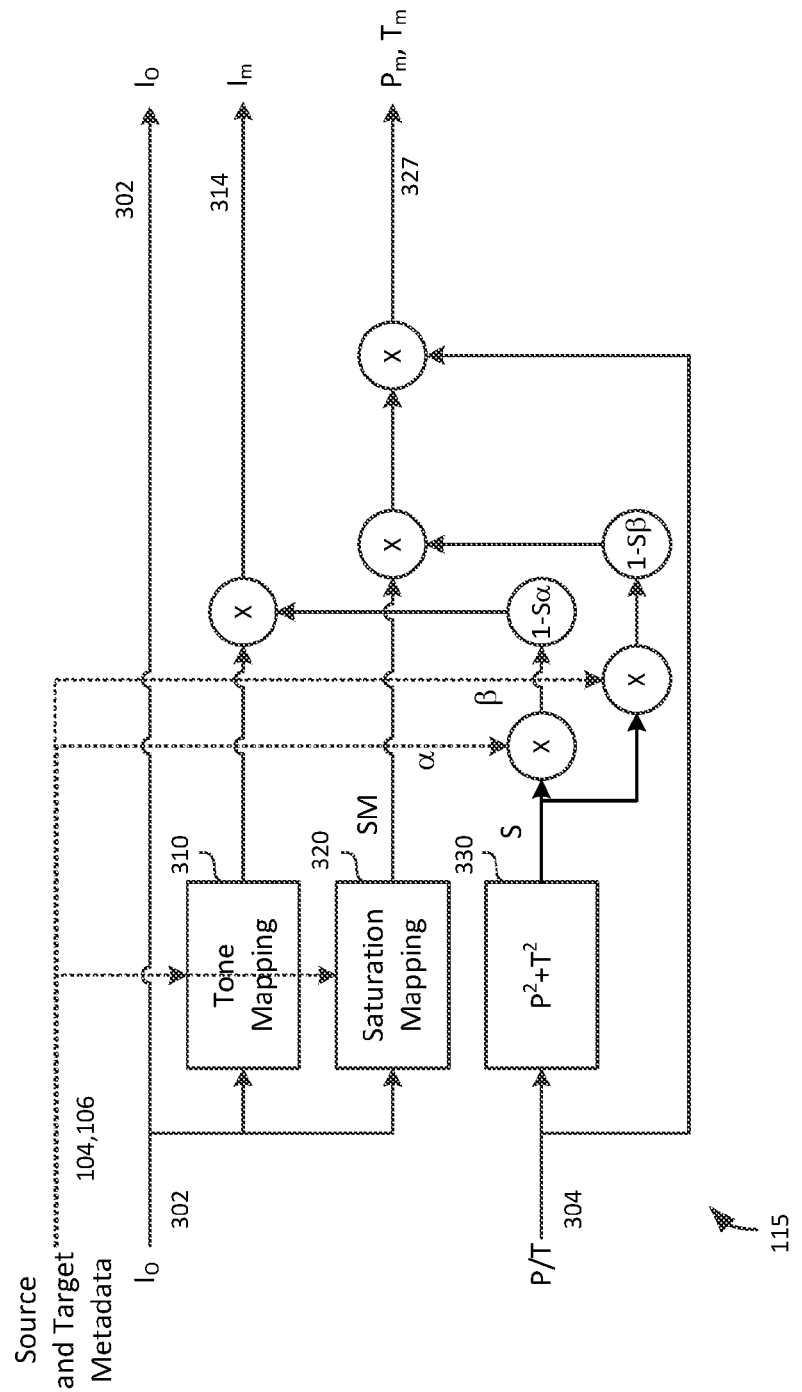
FIG. 3 depicts an example process for color volume mapping for EDR images according to an embodiment of the present invention.

Efficient display management (e.g., tone and gamut mapping) of enhanced dynamic range (EDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the efficient display management of EDR images. A display management processor receives an input image with enhanced dynamic range to be displayed on a target display which has a different dynamic range than a source reference display. The input image is first transformed from an input color space (e.g., RGB or YCbCr) into a perceptually-quantized (PQ) color space, preferably the IPT-PQ color space. A color volume mapping function, which includes an adaptive tone-mapping function and an adaptive gamut mapping function, generates a first mapped image. A detail-preservation step is applied to the intensity component of the first mapped image to generate a final mapped image with a filtered tone-mapped intensity image. The final mapped image is then translated back to the display's preferred color space. Examples of the adaptive tone mapping and gamut mapping functions are provided.

Example Display Management Processing Pipeline

FIG. 1 depicts an example process for the display management of EDR images (which also may be referred to as HDR images) according to an embodiment of the present invention. This process shares many similarities with the display management process described in PCT Application with Ser. No. PCT/US2014/016304, to be referred from now on as the '304 application, filed on Feb. 13, 2014, which is incorporated herein by reference in its entirety; however, the proposed embodiments include multiple improvements that allow for reduced computational complexity while improving overall image quality.

As depicted in FIG. 1, a video processor (e.g., a media server, a set-top box, an image display, or other suitable image processor) receives EDR input $V_1$ (102) and optionally associated source and content metadata (104) and target metadata (106). EDR input (102) may comprise part of a frame or a full frame of a sequence of images, such as an EDR video signal. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR input (102) may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intent.

EDR input (102) may also include source display metadata (104) related to the display used to color grade the image during program production. For example, such metadata may include the reference electro-optical transfer function (EOTF) (e.g., Rec. ITU-R BT.1866 (03/2011) or SMPTE ST 2084:2014). The EDR input may also include additional source display and content metadata (104), such as the maximum and minimum brightness of the source or reference display, the maximum, minimum, and average mid-tone of the data, and the intensity of ambient light during color grading. For example, the metadata for a reference monitor may include the following example parameters used in production:

Source Monitor Min. brightness, Smin=0.005 nits;
Source Monitor Max. brightness, Smax=4000 nits;
Ambient Light, Samb=10 nits;
Gamma, Sgamma=2.4;
Color Space=DCI P3, White Point=D65;

Metadata for the reference monitor need to be transmitted typically only once; however, metadata for the video data may be transmitted on a per-frame basis, on a per-scene basis, or whenever there is a change. If there are no metadata related to the source content, then in some embodiments such data may be extracted by analyzing the source video content. Target metadata (106) are delivered by the target display and may describe the target display characteristics (e.g., maximum brightness, color gamut, and the like.)

The IPT-PQ Color Space

In a preferred embodiment, the processing pipeline (100) is performed in what will be referred to as the perceptually-quantized IPT or IPT-PQ color space; however, similar processing steps may be performed in other color spaces, such as linear RGB, gamma RGB, YCbCr, XYZ, CIE-Lab, and the like. As appreciated by the inventor, operating in the IPT-PQ color space offers a number of advantages, such as: performing the display management pipeline in fixed point and at a lower bit depth and reducing color artifacts due to tone-mapping and gamut-mapping operations. IPT, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of the target display.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

An example of an EOTF based on a PQ curve is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Table 1 describes the calculation of the Perceptual Curve EOTF for converting digital video code values into absolute linear luminance levels at a point of display. Also included is the inverse EOTF (OETF) calculation for converting absolute linear luminance into digital code values

TABLE 1

Exemplary Equation Definitions:

D = Perceptual Curve digital code value, SDI-legal unsigned integer, 10 or 12 bits
b = number of bits per component in digital signal representation, 10 or 12
V = normalized Perceptual Curve signal value, $0 \leq V \leq 1$
Y = normalized luminance value, $0 \leq Y \leq 1$
L = absolute luminance value, $0 \leq L \leq 10{,}000$ cd/m$^2$ Exemplary EOTF Decode Equations:

$$V = \frac{D - 4 \cdot 2^{b-10}}{1015 \cdot 2^{b-10}}$$

$$Y = \left(\frac{\max[(V^{1/m} - c_1), 0]}{c_2 - c_3 V^{1/m}}\right)^{1/n} \quad (t1)$$

$L = 10{,}000 \cdot Y$

Exemplary Inverse EOTF Encode Equations:

$$Y = \frac{L}{10{,}000}$$

$$V = \left(\frac{c_1 + c_2 Y^n}{1 + c_3 Y^n}\right)^m \quad (t2)$$

$D = \mathrm{INT}(1015 \cdot V \cdot 2^{b-10}) + 4 \cdot 2^{b-10} \quad (t3)$

Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 . . . and +1 for fractional parts in the range of 0.5 to 0.9999 . . . , i.e. it rounds up fractions above 0.5.
2. All constants are defined as exact multiples of 12 bit rationals to avoid rounding concerns.
3. R, G, or B signal components are to be computed in the same way as the Y signal component described above.

FIG. 2 depicts an in more detail an example process for the color conversion step (110), according to an embodiment. As depicted in FIG. 2, given input EDR signal $V_1$ (102) which is in a first color format (e.g., YCbCr 4:2:0 or RGB gamma 4:4:4), color space transformation step (110) translates it into signal $V_{IL}$ (112) in the perceptually-corrected IPT color space (IPT-PQ). This color transformation may comprise the following steps:

a) Step (215), if needed, may perform chroma up-sampling or other pre-processing operations (e.g., scaling the input to be within the range (0, 1)) to generate output (217).

b) Input EDR signal (102) may be gamma coded or PQ coded, which is typically signaled using source metadata (104). Step (220) may use the EOTF (as provided by metadata (104)) to reverse or undo the source display's conversion from code values to luminance. For example, if the input signal is gamma coded, then this step applies an inverse gamma function. If the input signal is PQ-encoded (e.g., according to SMPTE ST 2084), then this step applies an inverse PQ function. In practice, the linearization step (220) may be performed using three pre-computed 1-D Look-up tables (LUTs).

c) Step (225) converts the linearized signal (222) to a signal (227) in the LMS color space. Typically, this step is performed by a) translating the input to the XYZ color space using standard transforms, and then applying a 3×3 matrix to translate the signal from XYZ to LMS.

d) (Step 230). According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in step (230) the traditional power function for a non-linear encoding of LMS to IPT is replaced with the PQ non-linear encoding. For example, the non-linear L, M, and S values are computed the same way as the V signal in equation (t2), where the Y signal is replaced by the linear L, M, or S component values. In some embodiments, a normalized version of PQ encoding may be used, wherein the step of equation (t3) may be omitted and the range of output PQ values is between 0 and 1. In some embodiments, alternative PQ encodings (e.g., as the one suggested by Stessen) may also be applied e) Using a standard LMS to IPT 3×3 linear transform, step (235) completes the conversion of signal (102) to the IPT-PQ color space.

In some embodiments, the complete color transformation pipeline (e.g., 110) may be computed using a 3D LUT. Furthermore, in embodiments where the input signal is already in the IPT-PQ space, the input color space conversion (110) may be bypassed.

Color Volume Mapping

After the color transformation step (110), the intensity ($I_O$) and chroma (P/T) of signal $V_{IL}$ (112) needs to be mapped to fit within the constraints of the target display. FIG. 3 depicts an example implementation of a color volume mapping process (115) according to an embodiment. The first part of the color volume mapping process (115) determines an amount to darken the colors based on both their saturation and their intensity. In an embodiment, without limitation, a metric of saturation S may be computed as the sum of the square of the chroma components, or $$S = P^2 + T^2. \quad (1)$$

Tone mapping function (310) applies a non-linear mapping to the intensity $I_O$ (302) of the input data $V_{IL}$ (112) to generate tone-mapped intensity data $I_m$ (314) (e.g., $I_m = f_T(I_O)$). An example non-linear mapping transform is described by A. Ballestad et al., in U.S. Pat. No. 8,593,480, (to be referred as the '480 patent), titled "Method and apparatus for image data transformation," which is incorporated herein by reference in its entirety.

According to the '480 patent, an example transfer function for non-linear mapping may be denoted as $$Y_{out} = \left(\frac{C_1 + C_2 Y_{in}^{Slope}}{1 + C_3 Y_{in}^{Slope}}\right)^{Rolloff}, \quad (2)$$

where $C_1$, $C_2$, and $C_3$ are constants, $Y_{in}$ is the input value for a color channel (e.g., $I_O$), $Y_{out}$ is the output value for the color channel, and Slope and Rolloff are parameters. This transfer function is an example of a parameterized sigmoidal tone curve function. The exponent Slope specifies the desired contrast at the midpoint. It may be derived from the ratio between source and target displays to allow for slightly higher contrast for darker images. The exponent Rolloff determines how sharply the curve rolls off in the top and the bottom of the curve. A smaller value results in a sharper roll off. Parameters $C_1$, $C_2$, and $C_3$ are determined based on the definition of three anchor points, which in turn are defined based on the brightness characteristics of the reference (or source) display, which are typically extracted from input metadata (104), and the brightness characteristics of the target display, which are typically already known to the processor performing the display management process via target metadata (106).

The key concept in the tone mapping is to preserve the overall image appearance by making as little change as possible to the mid-point intensity and contrast. The shadows and highlights are then smoothly mapped into the target display's luminance range. In an example embodiment, step (310) may compute the tone curve parameters of equation (2) as follows:

Let Tmin, and Tmax denote the minimum and maximum brightness of the target display, represented with PQ encoding. Let also Smin, and Smax denote the minimum and maximum brightness of the source display, also PQ encoded, then, in an embodiment, the S2Tratio may be defined as:

$$Smid = \left(\frac{Smin + Smax}{2}\right), \quad (3)$$

$$Tmid = \left(\frac{Tmin + Tmax}{2}\right),$$

$$S2Tratio = Smid - Tmid.$$

Given S2Tratio, in an embodiment, $$Shift = \frac{S2Tratio}{2}, \quad (4)$$

and $$Slope = S2Tratio + 1$$

The value of Shift denotes the mid-point of the mapping curve, or the amount to darken the input image to adapt it to the capabilities of the target display. Without loss of generality, in an embodiment, it is chosen to be half-way between the source and target display mid-points to preserve some of the director's creative intent for the image.

In an embodiment, a Rolloff=1/3 value has been subjectively determined to provide good image quality for a wide variety of images.

Given equations (2-4), parameters $C_1$, $C_2$, and $C_3$ can be derived by solving the system of equations that determine the tone-mapping curve passing through the specified minimum, maximum, and mid control points.

$$[x_1, x_2, x_3] = [Smin, Smid, Smax] \quad (5)$$

$$y_1 = \max(Smin - Shift, Tmin)$$

$$y_2 = Smid - Shift$$

$$y_3 = \min(Smax - Shift, Tmax)$$

$$\varepsilon = x_3 y_3 (x_1 - x_2) + x_2 y_2 (x_3 - x_1) + x_1 y_1 (x_2 - x_3)$$

$$\begin{pmatrix} C_1 \\ C_2 \\ C_3 \end{pmatrix} = \frac{1}{\varepsilon} \begin{pmatrix} x_2 x_3 (y_2 - y_3) & x_1 x_3 (y_3 - y_1) & x_1 x_2 (y_1 - y_2) \\ x_3 y_3 - x_2 y_2 & x_1 y_1 - x_3 y_3 & x_2 y_2 - x_1 y_1 \\ x_3 - x_2 & x_1 - x_3 & x_2 - x_1 \end{pmatrix} \begin{pmatrix} y_1 \\ y_2 \\ y_3 \end{pmatrix}.$$

In some embodiments, a modification to the tone curve described above may be desired, for example when mapping to a brighter or darker viewing environment. This may be accommodated via two additional parameters that can be adjusted subjectively: Contrast and Brightness. Given Contrast and Brightness, the original Shift and Slope parameters of equation (4) may be adjusted as $$Shift = \frac{S2Tratio}{2} + Brightness \quad (6)$$

$$Slope = S2Tratio + 1 + Contrast.$$

The Brightness control has the effect of globally raising or lowering the brightness of the entire image, although it may affect only the midpoint depending on the target display dynamic range. The Contrast control has the effect of raising or lowering the contrast around the midpoint, although it may decrease the contrast in shadows or highlights depending on the target display dynamic range.

The Brightness and Contrast controls can be modified to achieve two purposes. Firstly they can be adjusted at an end display in order to compensate for a different viewing environment. This is done via a PLUGE-type operation, where a user adjusts brightness and/or contrast until black and white detail is subjectively visible in an image. The second use of these parameters is as part of the metadata to fine-tune the default mapping for a particular shot in order to achieve a particular subjective impression.

Given the $C_1$, $C_2$, and $C_3$ parameter above, in an embodiment, the mapped intensity may be computed as:

$$I_m = f_T(I_o) = \left(\frac{C_1 + C_2 I_o^{Slope}}{1 + C_3 I_o^{Slope}}\right)^{Rolloff}. \quad (7)$$

In practice, computing the tone-mapped image (314) is typically implemented using a look-up table.

As depicted in FIG. 3, color volume mapping (115) includes a saturation mapping function (320) which is used to adjust the chroma values (P/T) (304) based on the changes in intensity. As the intensity of colors is reduced, their saturation is also decreased to maintain their appearance or balance. In an embodiment, the saturation mapping (320) may be expressed as $$f_{SM}(I_o) = I_m - I_o + 1. \quad (8)$$

The tone mapping and saturation curves are computed for the specified source and target display capabilities, and optionally, any user adjustments. Once they have been computed, they can be applied to each pixel independently to map from a source color volume to a target color volume. The core of the procedure is to first apply the tone curve to input intensity, and then scale each of the chroma channels by the saturation curve. By applying the same scale to both chroma channels one preserve hues, which in IPT is defined by the angle between P and T. Hence, in an embodiment, $$I_m = f_T(I_o),$$

$$P_m = f_{SM}(I_o) * P,$$

$$T_m = f_{SM}(I_o) * T. \quad (9)$$

This generally produces good results for colors that end up within the target display color volume. However it does not account for the fact that the target display may not be able to produce bright, saturated colors. In that case, as appreciated by the inventor, some further chroma adjustment may be needed.

After the color volume mapping, any colors that remain outside of the target display color volume will be clipped in the RGB space, which can introduce artifacts. To reduce the colors left outside, an embodiment provides two means to further map colors into the target display color volume. The first one is to darken bright, saturated colors, and the second is to desaturate highly saturated colors. Then, the color volume mapping procedure of equation (9) may be modified as shown below $$S = P^2 \pm T^2,$$

$$I_m = f_T(I_o) * (1 - S * \alpha),$$

$$P_m = P * f_{SM}(I_o) * (1 - S * \beta),$$

$$T_m = T * f_{SM}(I_o) * (1 - S * \beta), \quad (10)$$

where $\alpha$ and $\beta$ are weights, typically received through the metadata.

In equation (10), the pixel saturation S is computed first and used as a mask for the adaptive gamut mapping. This ensures that near-neutral colors are not affected while highly saturated colors are affected the most. The intensity of colors is adjusted according to both their saturation and intensity by some amount $\alpha$. Likewise, the saturation is adjusted according to the saturation and another amount $\beta$. By specifying the weights between these two directions one can control the color volume mapping strategy to improve color accuracy and reduce color artifacts in the output image. The greatest adjustment is applied to the bright, saturated colors. In an embodiment, typical values of these weights range between 5 and 15. In an embodiment, equation (10) may also include clip operations so that the values of $(1-S*\alpha)$ and $(1-S*b)$ are never negative or zero.

In another embodiment, equations (10) may be generalized as $$I_m = f_T(I_o) * f_{TS}(S),$$

$$P_m = P * f_{SM}(I_o) * f_{SS}(S),$$

$$T_m = T * f_{SM}(I_o) * f_{SS}(S), \quad (10a)$$

where $f_{TS}(S)$ and $f_{SS}(S)$ denote very general linear or non-linear functions of S. For example, for $f_{TS}(S)=(1-S*\alpha)$ and $f_{SS}(S)=(1-S*\beta)$, equation (10a) becomes equation (10). Equations (10a), in turn, may also be further generalized in terms of joint-mapping functions as $$I_m = f_{TJ}(I_o, S),$$

$$P_m = P * f_{SJ}(I_o, S),$$

$$T_m = T * f_{SJ}(I_o, S). \quad (10b)$$

The advantage of equations (10) and (10a) versus the generalized approach of (10b) is that the mappings are expressed as separable equations, which simplifies the processing requirements.

Detail Preservation

Figure 4:
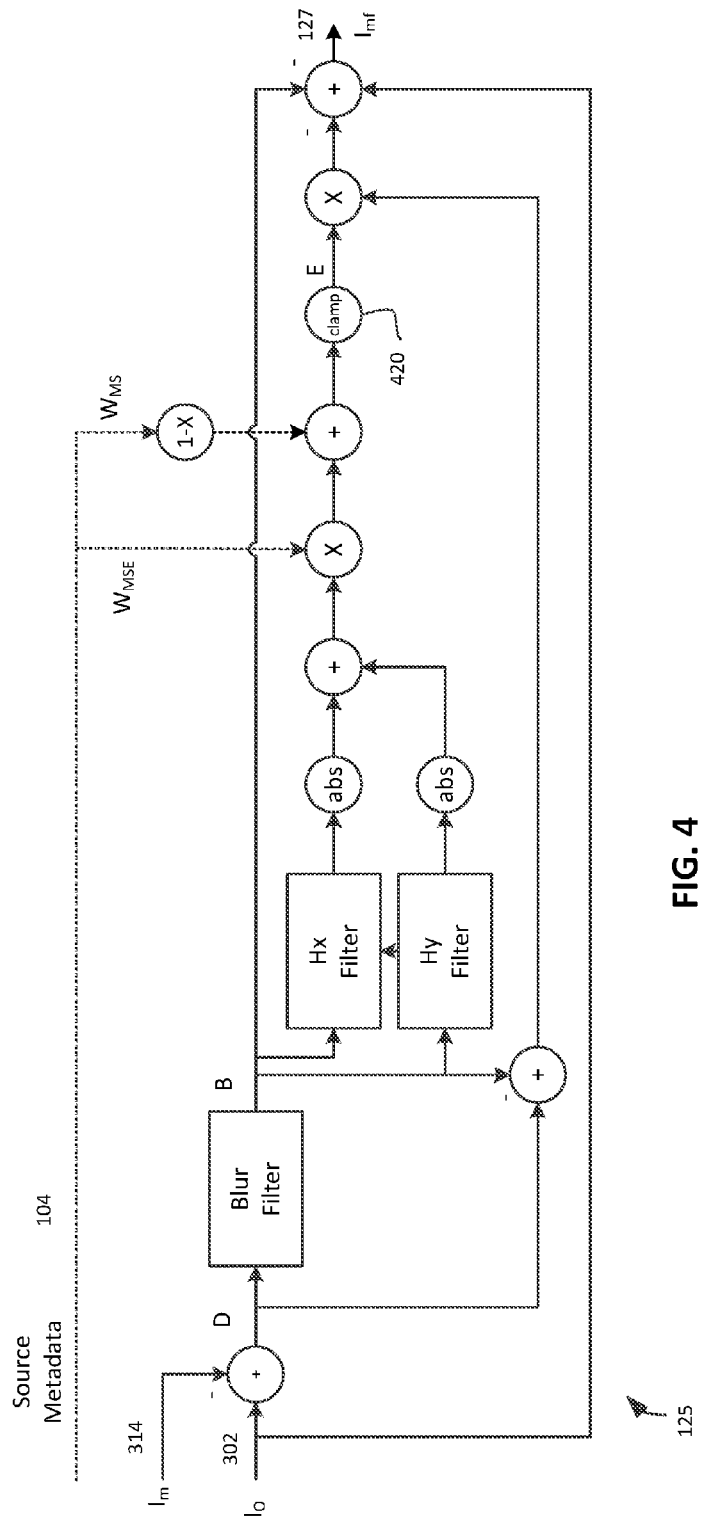
FIG. 4 depicts an example process for detail preservation according to an embodiment of the present invention.

The tone mapping operator of equation (4) is typically referred to as a global tone-mapping operator since the same equation is applied to a whole image or frame. In an embodiment, global tone-mapping may be followed by a detail preservation operator (125) which improves local contrast. This step also restores high-frequency detail in the intensity channel, lost due to the tone-mapping operation. Examples of such a local tone mapping operators are described in the '480 patent and in the '304 application. FIG. 4 depicts another example of detail preservation according to an embodiment. Given the inputs $I_o$ (302), $I_m$ (314), and source metadata (104), process (125) generates a filtered intensity image $I_{mf}$ (127) according to the following steps.

Let $W_{MSE}$ and $W_{MS}$ denote adjustable weights (e.g., $W_{MS}=1$, $W_{MSE}=4$), which may be extracted from the source metadata. These weights control the amount of detail preservation to be applied. As depicted in FIG. 4, let $$D = I_o - I_m, \quad (11)$$

$$B = F(D, H), \quad (12)$$

where F(D,H) denotes applying to image D a filter with kernel H. In an example embodiment, H comprises a separable 5×11 Gaussian filter with $\sigma=2$; however, alternative filters may also be applied.

Filters Hx and Hy are 1-D edge-detection filters. In embodiment, the filter kernels for Hx and Hy correspond to $[-1\ 0\ 1]$ and $[-1\ 0\ 1]^T$, respectively. Hence, given $$Ex = F(B, Hx),$$

$$Ey = F(B, Hy), \quad (13)$$

$$E = (|Ex| + |Ey|) * W_{MSE} + (1 - W_{MS}).$$

In some embodiment, a clamp function (420) may also be applied to E to guarantee that its value always ranges between 0 and 1. For example, $$E = \max(0, \min(1, (|Ex| + |Ey|) * W_{MSE} + (1 - W_{MS}))).$$

Then $$I_{mf} = I_o - B - E * (D - B). \quad (14)$$

Output Color Conversion

Figure 5:
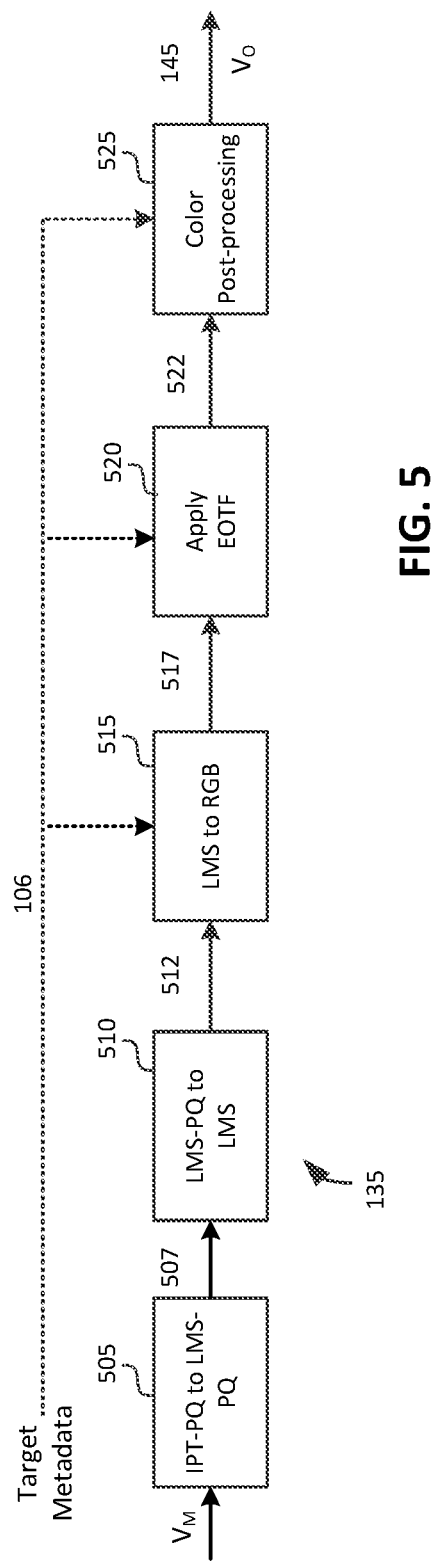
FIG. 5 depicts an example process for output color conversion according to an embodiment of the present invention.

FIG. 5 depicts an example of color conversion process (135) to translate the mapped EDR signal $V_M$ (which comprises the $I_m$, $P_m$, $T_m$ or the $I_{mf}$, $P_m$, $T_m$ components) from the perceptually-quantized color space (e.g., IPT-PQ) back to a desired color space (e.g., RGB or YCbCr). This process mirrors the processing steps in the input color converter (110), performed now in reverse order. As depicted in FIG. 5, the color conversion may include the following steps:

a) Step (505): Convert the mapped signal $V_M$ from the IPT-PQ space to the LMS-PQ space using a 3×3 IPT to LMS transformation.

b) Step (510): Convert the LMS-PQ signal (507) from the LMS-PQ space to the LMS space. This step is computed using the equations of Table 1. In an embodiment, this step may be performed using three 1-D LUTs.

c) Step (515): Convert the LMS signal (512) to the target display color (e.g., RGB) (517), typically performed using a 3×3 matrix based on the profile of the target display.
d) Step (520): Apply the display's EOTF (e.g., gamma or PQ encoding) to signal (517) to generate output signal (522).
e) Step (525): If needed, apply additional post-processing (e.g., color conversion and color sub-sampling).

This step is purely colorimetric, meaning that the parameters are derived from measurements or known display specifications, and no tuning or subjective modification is typically necessary. After stage (520) there may be some remaining values outside of the target display capabilities. In this case the recommended practice is to clip to the display capabilities; however, one may also attempt to adjust the color volume mapping weights (e.g., α and β) to achieve the desired output.

As appreciated by the inventor, the proposed display management pipeline (100) offers a number of distinct advantages over prior solutions, including:
Adaptive tone mapping
Adaptive gamut mapping
Better output color accuracy due to adjustable chroma-related weights
Computationally simpler, but improved detail preservation
Adaptive adjustments (e.g., for brightness and contrast) based on the target display viewing environment (such as ambient light characteristics or viewer preferences.)

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the display management and display of images with enhanced dynamic range, such as those described herein. The computer and/or IC may compute any of a variety of parameters or values that relate to the display management processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the display management of EDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient display management of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:
1. A method comprising:
accessing an input image in a first color space with a first dynamic range;
applying a color transformation step to the input image to determine a first output image in a perceptually-quantized IPT (IPT-PQ) color space, the first output image comprising intensity pixel values and chroma components pixel values, wherein the color transformation step comprises applying a non-linear perceptual quantizer function to a function of the input image;
applying a color-volume mapping function to the first output image to generate a tone-mapped output image, the tone-mapped output image comprising intensity pixel values and chroma components pixel values,
wherein the color-volume mapping function comprises a tone mapping function, a saturation mapping function, and a pixel saturation estimate function,
wherein the tone mapping function generates the intensity pixel values of the tone-mapped output image by applying a non-linear mapping to the intensity pixel values of the first output image,
wherein the saturation mapping function generates the chroma components pixel values of the tone-mapped output image by adjusting the chroma components pixel values of the first output image based on changes in intensity,
wherein the pixel saturation estimate function computes a saturation metric (S) as the sum of squares of the chroma components pixel values of the first output image, wherein the saturation metric is applied to the tone-mapped output image to darken bright saturated colors and to desaturate highly saturated colors, thereby modifying the intensity pixel values and the chroma components pixel values; and applying a detail preservation function to the modified intensity pixel values of the tone-mapped output image to generate intensity pixel values of a filtered tone-mapped output image, the filtered tone-mapped output image comprising the modified chroma components pixel values of the tone-mapped output image.

2. The method of claim 1, wherein applying the color transformation step further comprises:

removing any non-linear encoding from the input image to generate a linear image;

converting the linear image into an LMS color image; and applying the non-linear perceptual quantizer (PQ) function to the LMS color image to generate the first output image.

3. The method of claim 2, wherein the non-linear perceptual quantizer function comprises the SMPTE ST 2084 mapping function.

4. The method of claim 1, wherein the tone-mapping function is expressed as a parameterized sigmoidal tone curve function, wherein parameters of the function are determined based on characteristics of a source display and a target display.

5. The method of claim 4, wherein the characteristics of the source display comprise a minimum brightness value and a maximum brightness value for the source display.

6. The method of claim 4, wherein the characteristics of the target display comprise a minimum brightness value and a maximum brightness value for the target display.

7. The method of claim 4, wherein the characteristics of the source display are accessed through received source display metadata.

8. The method of claim 4, wherein the sigmoidal tone function is expressed as $$I_m = \left( \frac{C_1 + C_2 I_o^{Slope}}{1 + C_3 I_o^{Slope}} \right)^{Rolloff}$$

wherein $C_1$, $C_2$, $C_3$, Slope, and Rolloff are constants defining the parameters of the tone-mapping function, and for an input $I_o$, represented by an intensity pixel value of the first output image, $I_m$ is a corresponding output value, represented by the corresponding intensity pixel value of the tone-mapped output image.

9. The method of claim 4, wherein parameters of the tone-mapping function are further determined based on a Brightness value and a Contrast value to adjust overall brightness and contrast of the tone-mapped output image.

10. The method of claim 1, wherein the saturation mapping function is expressed as $$f_{SM}(I_o) = I_m - I_o + 1$$

wherein $I_m$ denotes the output of the tone-mapping function, and $I_o$ denotes the intensity pixel values of the first output image, and wherein applying the color-volume mapping function comprises computing:

$$I_m = f_T(I_o) * (1 - S*\alpha),$$

$$P_m = P * f_{SM}(I_o) * (1 - S*\beta),$$

$$T_m = T * f_{SM}(I_o) * (1 - S*\beta),$$

where S denotes the saturation metric generated by the pixel saturation estimation function, $\alpha$ and $\beta$ denote input weights, $f_T(I_o)$ denotes the tone-mapping function, $f_{SM}(I_o)$ denotes the saturation mapping function, $I_o$ denotes the intensity pixel values of the first output image, P and T denote the chroma components pixel values of the first output image, $I_m$ denotes the pixel values of the tone-mapped output image, and $P_m$ and $T_m$ denote the color components pixel values of the tone-mapped output image.

11. The method of claim 10, wherein the values of $(1-S*\alpha)$ and $(1-S*\beta)$ are clamped to always be larger than zero.

12. The method of claim 1, wherein applying the detail preservation function further comprises computing:

$$D = I_o - I_m,$$

$$B = F(D, H),$$

$$Ex = F(B, Hx),$$

$$Ey = F(B, Hy),$$

$$E = (|Ex| + |Ey|) * W_{MSE} + (1 - W_{MS}),$$

$$I_{mf} = I_o - B - E * (D - B)$$

where F(D,H) denotes applying to image D a filter with kernel H, $I_o$ denotes intensity pixel values of the first output image, $I_m$ denotes the intensity pixel values of the tone-mapped output image, $I_{mf}$ denotes the intensity pixel values of the filtered tone-mapped output image, B denotes the output of a blur filter, Ex denotes the output of a horizontal edge-detection filter, Ey denotes the output of a vertical edge-detection filter, and $W_{MSE}$ and $W_{MS}$ are weights.

13. The method of claim 12, wherein the E output value is further clamped to be between 0 and 1.

14. The method of claim 12, wherein the kernel H comprises a 5×11 Gaussian filter with standard deviation equal to 2.

15. The method of claim 12, wherein the kernel H comprises a low-pass filter.

16. An apparatus comprising a processor and configured to perform any one of the methods recited in claim 1.

17. A non-transitory computer-readable storage medium having stored thereon computer-executable instruction for executing a method in accordance with claim 1.

* * * * *